April 29, 1941.   F. G. HODELL   2,240,261
TRACTION DEVICE
Filed Nov. 16, 1938   2 Sheets-Sheet 2

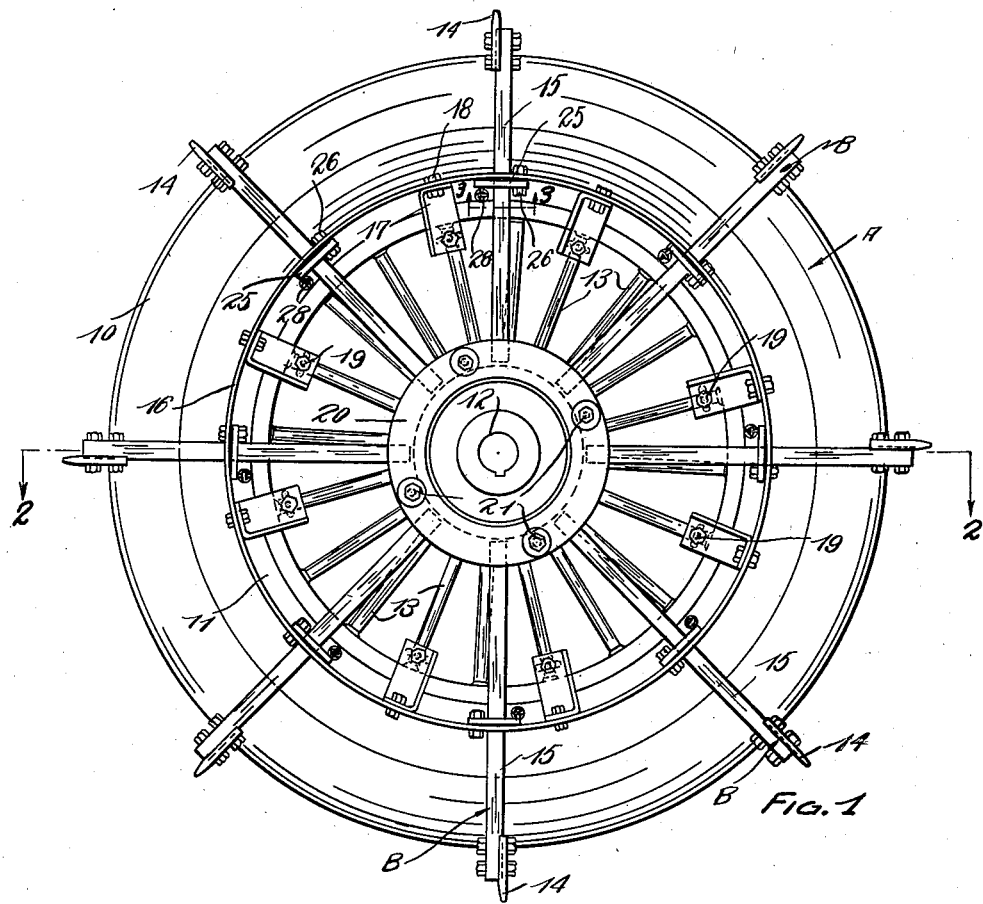

INVENTOR.
FREDERICK G. HODELL
BY Kerio Hudson & Kent
ATTORNEYS

Patented Apr. 29, 1941

2,240,261

UNITED STATES PATENT OFFICE 2,240,261

TRACTION DEVICE

Frederick G. Hodell, Gates Mills, Ohio, assignor to The Hodell Chain Company, Cleveland, Ohio, a corporation of Ohio Application November 16, 1938, Serial No. 240,803

3 Claims. (Cl. 301—44)

The present invention relates to motor-driven vehicles and more particularly pneumatic tired tractor wheels.

Prior to the present invention, various devices have been employed for increasing the traction of the drive wheels of pneumatic tired tractors. Pneumatic tires having tread designs comprising deep grooves and high projections have been tried, as have non-skid chains, etc. While certain of these devices have been successful in a limited way, all prior art attempts to increase the traction of the driving wheels of tractors have had certain limitations and objectionable features, and the principal object of the present invention is the provision of a simple, reliable, and inexpensive device for increasing the traction of the drive wheels of pneumatic tired tractors which will be free from the objectionable features of the prior art.

Another object of the present invention is the provision of a novel, simple, rugged, and reliable device comprising a plurality of readily detachable traction members, adapted to be applied to a pneumatic tired tractor drive wheel for increasing the traction thereof when the tractor is driven through mud, loose ground, or a wet cover crop, etc.

Another object of the present invention is the provision of a novel pneumatic tired tractor drive wheel comprising a plurality of readily detachable tread members which increase the traction thereof when driving through loose ground, etc.

The invention resides in certain details of construction and combinations and arrangements of parts and further objects and advantages thereof will be apparent to those skilled in the art to which the invention relates from the following description of the preferred embodiment of the invention described with reference to the accompanying drawings, in which similar reference characters designate corresponding parts, and in which:

Fig. 1 is a side elevation of a pneumatic tired tractor wheel embodying the present invention;

Fig. 2 is a section on the line 2—2 of Fig. 1, with portions shown in elevation;

Fig. 3 is a section on the line 3—3, Fig. 1;

Figure 4:
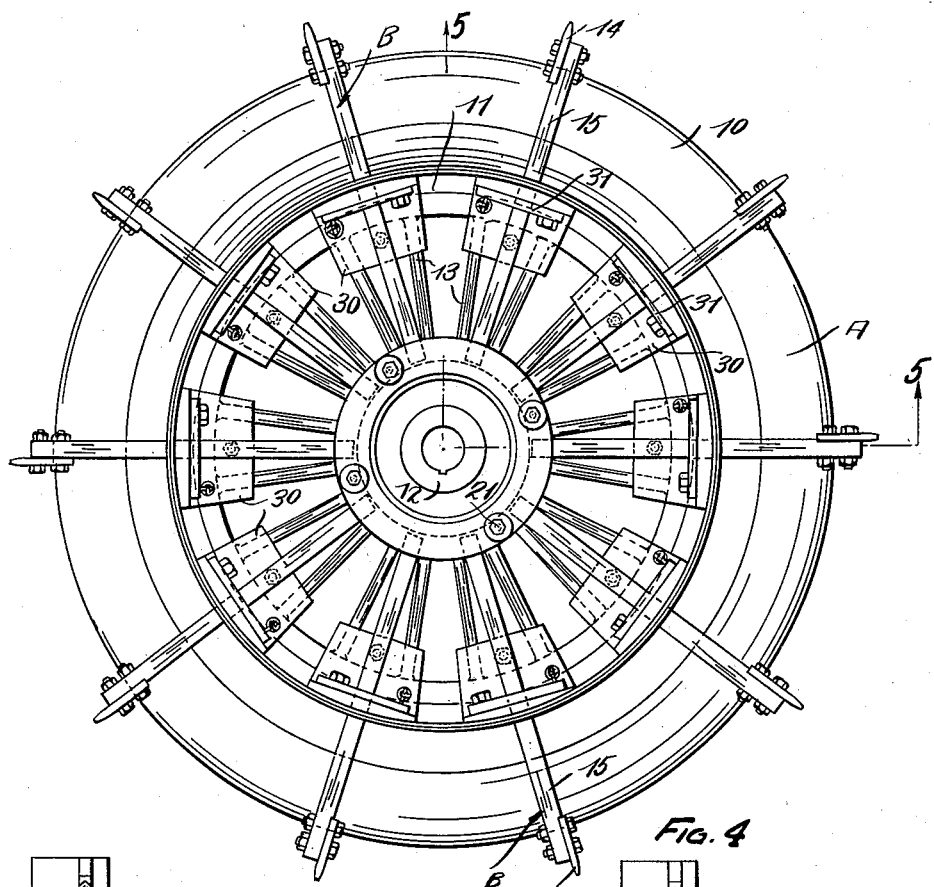
Fig. 4 is a view similar to Fig. 1 but showing a modified construction.

As previously stated, the present invention relates particularly to pneumatic tired tractor drive wheels and is herein illustrated and described as embodied in such a wheel.

Referring to the drawings, the reference character A designates a pneumatic tired tractor drive wheel comprising a pneumatic tire 10 mounted on a rim 11 secured to the hub 12 by wire spokes 13. The wheel thus far described is of commercially known construction and a further description thereof is not necessary to a complete understanding of the present invention.

According to the provisions of the present invention, the traction of the wheel is increased by a plurality of cleat-like tread members designated generally by the reference character B, readily detachably fixed to the tractor wheel in such a manner that they can be quickly attached to the wheel when needed. When not needed, the tread members may be stored in some suitable place about the tractor, such as the tool box.

Referring to the drawings, the tread members B comprise flat rectangular paddle-like members 14 bolted to the radial outer ends of rod members 15 generally square in cross-section. The rod members 15 project through suitable apertures formed in an annular band-like member 16 secured to the rim 11 of the wheel by brackets 17 fixed to the member 16 at spaced intervals by bolts 18. The brackets 17 are in turn secured to the spokes 13 of the wheel by J-bolts 19, the heads of which engage about the spokes of the wheel, as shown. The annular member 16 forms a continuation of the rim 11 (see Fig. 2). The radial inner ends of the rods 15 of the tread members B engage in suitable apertures formed in a ring-like hub member 20 secured to the wheel adjacent the hub 12 by J-bolts 21 in a manner similar to that in which the outer annular member 16 is secured to the wheel.

The tread members B are adapted to be held in assembled relation with the two annular members 16 and 20 by pivoted detents or latches 25 secured to the radially inner side of the outer annular member 16 by bolts 26 about which the latch members 25 are freely rotatable. The latch members 25 engage in suitable slots 27 formed in the rod members 15 and are continuously urged in a direction to engage in said slots by tension springs 28, the opposite ends of which are secured to the free ends of the latch members and to suitable projections formed on the outer annular member 16. As shown, the supporting member 20 is provided with a counterbore 29 into which a portion of the hub 12 extends. The construction helps to transmit the thrust of the tread members to the wheel proper.

From the foregoing description, it will be apparent that the tread members B may be readily assembled and disassembled with the tractor wheel and when not needed, may be stored in a convenient place. The paddle-like members project a considerable distance radially of the tire and afford adequate traction when the tractor is traveling through loose ground, mud, or a wet cover crop, etc.

Figure 5:
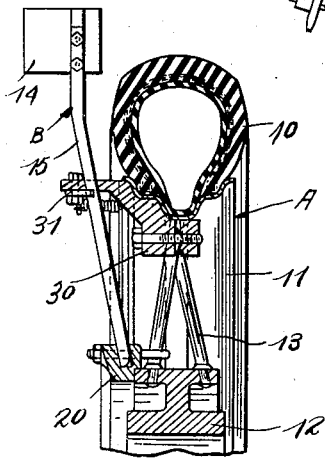
Fig. 5 is a section approximately on the line 5—5 of Fig. 4.

In the construction shown in Figs. 4 and 5, the outer annular member 16 of Figs. 1 and 2 has been replaced by a plurality of individual brackets 30, one for each tread member B. These brackets 30 are made in two parts so constructed that they can be readily clamped to the spokes 13 of the wheel. Each bracket 30 embraces two spokes and the parts of the brackets which engage the spokes conform to the slope of the spokes so that the brackets are firmly clamped thereto. Each bracket includes a spring-operated, pivoted latch 31 similar to the latch employed in the embodiment shown in Figs. 1 to 3, inclusive, for detachably securing the tread members B in position.

Figure 6:
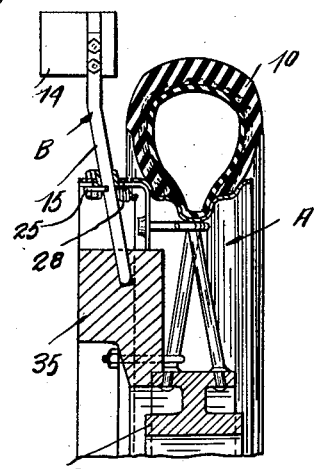
Fig. 6 is a view similar to Fig. 5 but showing a still further modified construction.

If desired, the inner annular member 20 which forms the radially inward support for the tread members B can be made large enough to serve as a weight. Such a construction is shown in Fig. 6 which shows a modification of the device shown in Figs. 1 and 2, wherein the hub member 20 has been replaced by an enlarged cast iron member 35 of considerable weight. It is also to be understood that the outer and inner supporting members for the tread members B may be welded to the rim and hub, respectively, of the wheel instead of being bolted to the spokes thereof, as shown in the drawings.

From the foregoing description of the preferred embodiments of the invention, it will be apparent that the objects of the invention heretofore enumerated have been accomplished and that a new and improved traction device for pneumatic tired tractor drive wheels, has been provided. While the preferred embodiments of the invention have been described with considerable detail, I do not wish to be limited to the particular constructions shown, which are merely illustrative of the invention. It is my intention to hereby cover all adaptations, modifications and uses thereof that come within the practice of those skilled in the art to which the invention relates and I particularly point out and claim the following:

1. A traction device of the character described for a pneumatic tire tractor drive wheel comprising a supporting member having an aperture therein, means adapted to secure said supporting member to one side of a pneumatic tired tractor drive wheel adjacent to the rim of the wheel with said aperture extending radially of the wheel, an annular supporting member having an aperture therein, means separate and apart from the first named means adapted to secure said annular supporting member to the wheel adjacent to the hub thereof with said aperture extending radially of the wheel and aligned with the aperture in the first named supporting member, a tread member having a rod-like shank adapted to be projected through the aperture in the first named supporting member and into the aperture in the second named supporting member and an enlarged head adapted to project radially beyond the pneumatic tire of the tractor wheel when assembled with said wheel, and means adapted to detachably secure said tread member in assembled relationship with said supporting members against movement radially of the wheel during operation.

2. In a traction device of the character described for a pneumatic tire tractor drive wheel comprising a supporting member in the form of an axially extending annular flange having a plurality of apertures therein, means adapted to secure said supporting member to one side of a pneumatic tired tractor drive wheel adjacent to the rim of the wheel with the apertures therein extending radially of the wheel, a second annular shaped supporting member having a plurality of apertures therein, means separate and apart from the first named means adapted to secure said second annular-shaped supporting member to the wheel adjacent to its hub with the apertures extending radially of the wheel and aligned with the apertures in the first named supporting member, a plurality of tread members each having a rod-like shank adapted to be projected through one of the apertures in the first named supporting member and into the aperture in the second named supporting member in line therewith and an enlarged head adapted to project radially beyond the pneumatic tire of the wheel, and means adapted to detachably secure said tread members in assembled relationship with said supporting members against movement radially of the wheel during operation.

3. In a traction device of the character described for a pneumatic tire tractor drive wheel comprising a supporting member in the form of an axially extending annular flange having a plurality of apertures therein, means adapted to secure said supporting member to one side of a pneumatic tired tractor drive wheel adjacent to the rim of the wheel with the apertures therein extending radially of the wheel, a second annular-shaped supporting member having a plurality of apertures therein, means separate and apart from the first named means adapted to secure said second annular-shaped supporting member to the wheel adjacent to its hub with the apertures therein extending radially of the wheel and aligned with the apertures in the first named supporting member, a plurality of tread members each having a rod-like shank adapted to be projected through one of the apertures in the first named supporting member and into the aperture in the second named supporting member in line therewith and an enlarged head adapted to project radially beyond the pneumatic tire of the tractor wheel, and spring-loaded latches carried by one of said supporting members and engageable within apertures in the shanks of said tread members, said latches being adapted to detachably secure said tread members in assembled relationship with said supporting members against movement radially of the wheel during operation.

FREDERICK G. HODELL.